United States Patent Office 3,184,361
Patented May 18, 1965

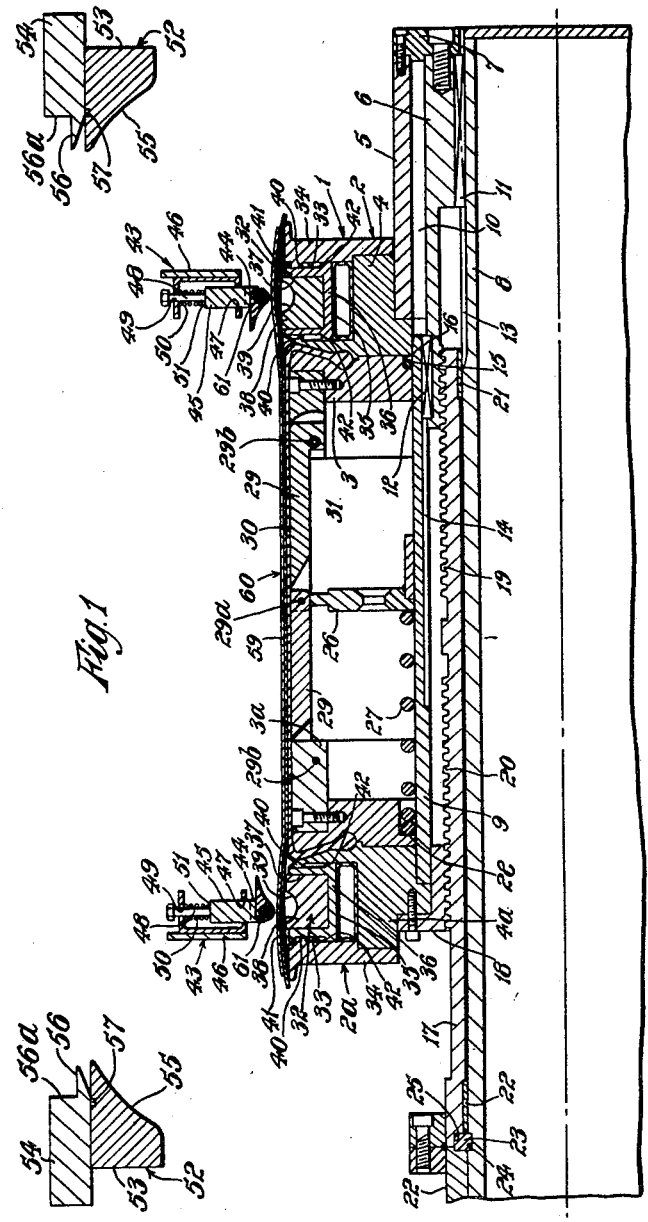

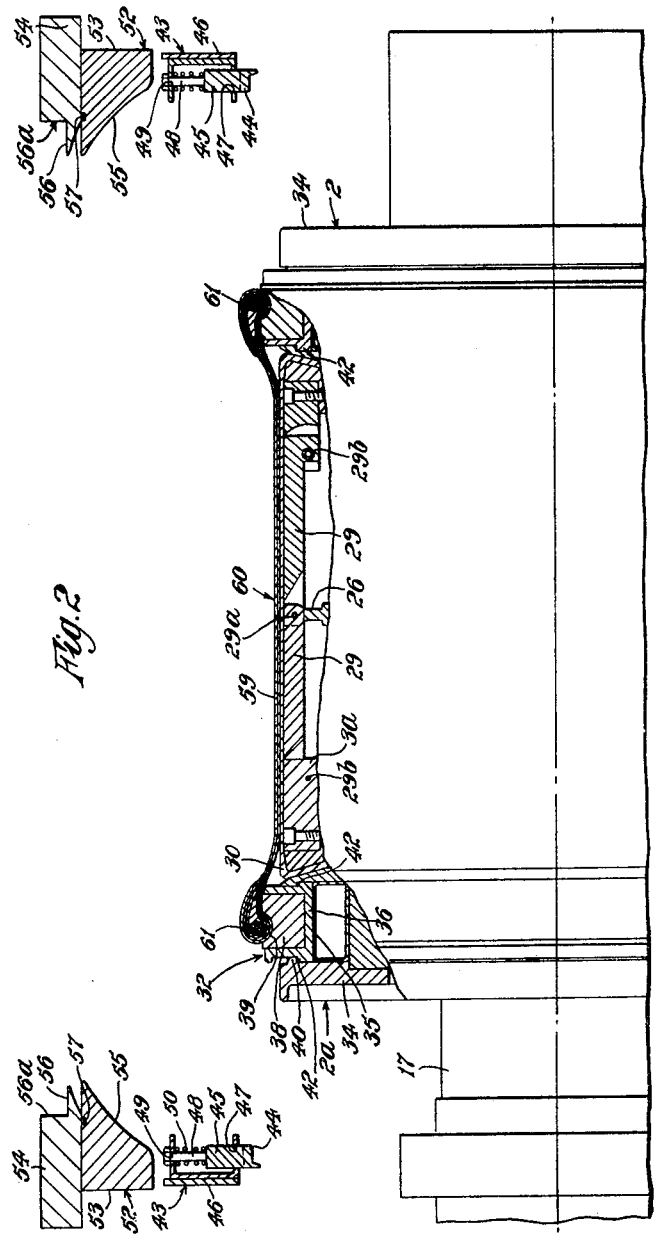

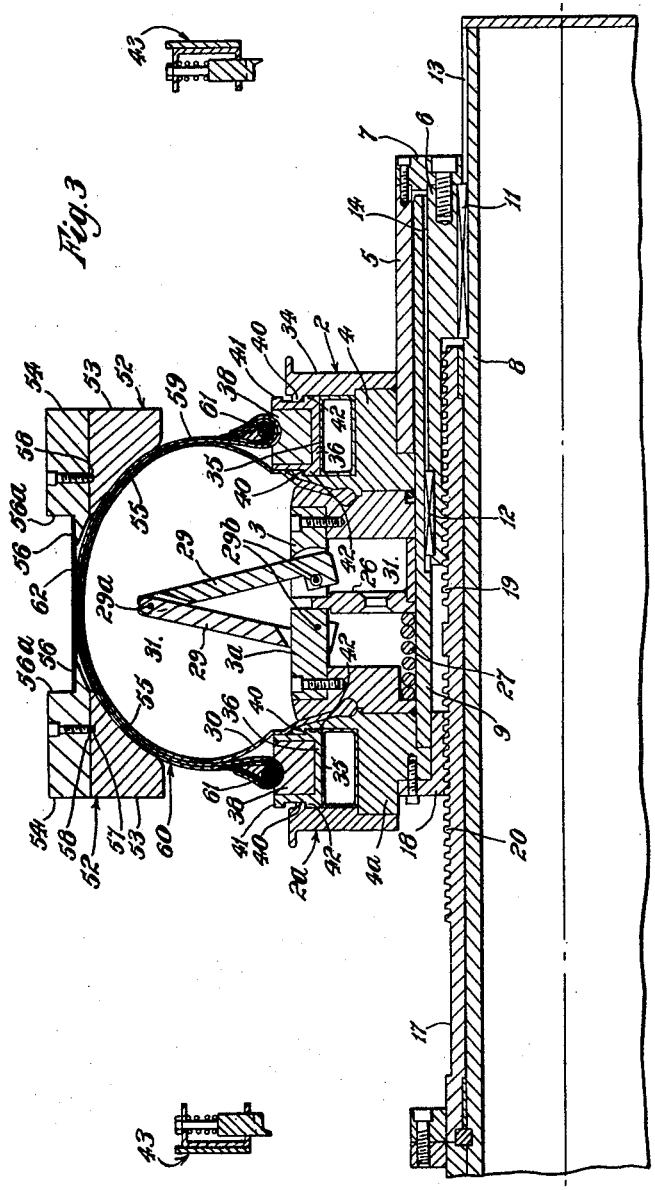

3,184,361
APPARATUS FOR THE MANUFACTURE OF
PNEUMATIC TIRES
Bernard Charles Allitt, Sutton Coldfield, England, assignor to Dunlop Rubber Company Limited, London County, England, a British company
Filed Oct. 30, 1962, Ser. No. 234,039
Claims priority, application Great Britain, Nov. 27, 1961, 42,299/61
13 Claims. (Cl. 156—415)

This invention relates to apparatus for the manufacture of pneumatic tires.

According to the invention apparatus for the manufacture of pneumatic tires comprises a tire building drum having a pair of end members, a flexible inflatable cylindrical diaphragm attached at its ends to the end members, one end to each end member, a plurality of collapsible intermediate drum segments located between the end members upon which the diaphragm lies, the diaphragm being supported in its cylindrical state when the intermediate segments are in the uncollapsed state, and means for collapsing the intermediate segments and for moving the end members towards and away from each other.

The intermediate segments may be in pairs, said pairs lying side-by-side circumferentially of the drum, and the segments of each pair lying end-to-end axially of the drum, the remote ends of the segments of each pair being pivotally mounted to the end members, one end to each end member, and the adjacent ends of the segments being pivotally connected together for movement of their adjacent ends radially outwardly of the drum to collapse the segments radially outwardly upon axial inward movement of the end members.

Bead gripping members may be provided one on each end member, each bead gripping member comprising an expansible ring for gripping the bead of a tire, and an inflatable member located radially within the expansible ring.

The invention also includes a pneumatic tire manufactured by the above apparatus.

One embodiment of the invention will now be described, by way of example, with reference to the accompanying drawings in which:

FIGURE 1 is an axial cross-sectional view of tire building apparatus according to the invention showing the condition of the apparatus at the commencement of the manufacture of a pneumatic tire upon the apparatus;

FIGURE 2 is a view of the apparatus partly in side elevation and partly in axial cross-section showing a stage in the manufacture of the tire; and FIGURE 3 is a view similar to FIGURE 1 of the apparatus, showing a further stage in the manufacture of the tire.

As shown in FIGURE 1, a tire building drum comprises a pair of coaxial cylindrical end members 2 and 2a. The member 2 comprises an axially inner portion 3 secured to an axially outer portion 4, and the member 2a comprises an axially inner portion 3a secured to an axially outer portion 4a.

The end member 2 is secured to the axially inner end of the radially outer sleeve 5 of a pair of coaxial sleeves 5 and 6, the sleeves being secured at their axially outer ends to a ring 7, slidably mounted upon one end of a driving shaft 8 of the former.

The end member 2a is secured to the axially outer end of another sleeve 9 which is mounted coaxially with respect to the sleeves 5 and 6, the sleeve 9 being axially slidable, for telescoping the sleeves, within an annular recess 10 contained between the sleeves 5 and 6. Upon its inner and outer peripheral surfaces, the sleeve 6 is provided, respectively, with keys 11 and 12 slidably received, respectively, within axially elongated keyways 13 and 14 provided, respectively, in the shaft 8 and sleeve 9 to prevent relative rotation of the shaft and the end members. A sealing means in the form of a rubber ring 15 is contained within an annular recess 16 formed in the inner peripheral surface of the end member 2, the ring being in air-tight sealing engagement with the outer peripheral surface of the sleeve 9 for a purpose to be described.

Means are provided for moving the end members towards and away from one another symmetrically with respect to the mid-circumferential plane of the drum, said means comprising a screw-threaded member in the form of a screw-threaded sleeve 17 which is contained between the sleeves 6 and 9 and the shaft 8.

The sleeve 6 is provided with an internal left-hand screw-thread, and a sleeve 18, secured radially within the end member 2a, is provided with a right-hand screw-thread, the sleeves 6 and 18 being in engagement, respectively, with complementary screw-threaded portions 19 and 20 provided on the sleeve 17.

The sleeve 17 is rotatably mounted relative to and coaxially around the shaft 8 by means of bearings 21 and 22, the sleeve being secured, at its end remote from the screw-threaded portion 19, to an axial extension 22' of the sleeve. The sleeve 17 is held axially in position upon the shaft by means of a split annular ring 23 disposed around the shaft within an annular groove 24 of the shaft and located within a second annular groove 25 formed between the sleeve and its extension 22. A clutch (not shown) is provided to nonrotatably clamp the sleeve 17 during rotation of the shaft 8 and end members in the appropriate direction to move the end members towards and away from one another.

Movement together of the end members is limited by means of an annular partition 26 slidable upon the sleeve 9, a helical coil compression spring 27 being provided between the partition and an abutting face 28 of the portion 3a of the end member 2a to assist movement of the partition into a medial plane when the end members are moved from a closely adjacent position to a spaced-apart position.

The end members are connected together by means of a plurality of collapsible intermediate drum segments 29 which are arranged in pairs, the segments in each pair lying, in their uncollapsed state as shown in FIGURE 1, end-to-end axially of the drum, and the pairs of segments lying side-by-side circumferentially of the drum to form a true cylindrical surface forming a continuation of the peripheral surface of the end members. The segments of each pair are pivotally connected together by a pivot pin 29a and their remote ends are pivotally mounted one to each end member upon pins 29b in positions radially inwardly of the pivotal connection between the segments so that upon movement of the end members towards one another as shown in FIGURE 3, the adjacent ends of the segments move radially outwardly to collapse the segments. In the uncollapsed state of the segments shown in FIGURE 1, the annular partition 26 forms an annular support for the segments, the inner peripheral surfaces of the segments being supported upon the outer peripheral surface of the partition.

A flexible inflatable cylindrical rubber diaphragm 30 extending between the end members is secured by its ends to the end members, one end to each end member between the portions 3 and 4, and 3a and 4a of the end members. In the uninflated cylindrical state of the diaphragm and the uncollapsed state of the segments 29, as shown in FIGURE 1, the diaphragm lies upon and is supported by the segments. An annular space 31 between the diaphragm and the sleeve 9 and bounded by the end members is air-tightly sealed by the attachment of the diaphragm to the end members and by the rubber sealing ring 15 around the sleeve 9. Means (not shown) are provided for connecting a source of compressed air with the space 31 to inflate the diaphragm, to cause the diaphragm to expand into toroidal shape (see FIGURE 3) when the end members are moved towards one another, and shape a tire built upon the outer peripheral surface of the diaphragm, the radially outwardly collapsed segments 29 being disposed within the toroidally inflated diaphragm.

Each end member incorporates bead gripping means 32. As the two bead gripping means are of similar construction, one only, that associated with the end member 2, will be described.

The bead gripping means 32 of end member 2 is received coaxially within an annular groove 33 formed between the axially outer portion 4 and a ring 34 secured coaxially to the portion 4. The gripping means comprises an inflatable annular bag 35 which is disposed around the base of the groove 33, the bag 35 supporting, upon its outer peripheral surface, a segmental ring 36, the segments of which are arranged end-to-end circumferentially of the end member and are slidable radially within the groove 33. Received within an annular groove 37 of the ring is an expansible resilient rubber ring 38 which is provided upon its outer peripheral surface with an annular groove 39 forming bead seating means. Two axially extending annular abutments 40 are provided one on the portion 4 of the end member and the other on the ring 34 for limiting the radially outward and inward movement of the bead gripping means. An annular abutment 41, integrally formed on the segmental ring, engages the abutment 40 of the ring 34, as shown in FIGURE 1, when the bag 35 is in a deflated state to locate the outer peripheral surface of the ring 38 slightly radially outwardly of the peripheral surface of the end member. As shown in FIGURE 2, two abutments 42, formed on the radially inner portion of the segmental ring, engage the abutments 40 upon inflation of the bag 35 to hold the ring 38 in a radially outer position for gripping a bead wire of a tire carcass being built on the drum.

A pair of bead-setting ring assemblies 43 are provided, one at each end of the drum, the assemblies 43 being movable (by means not shown) from axially retracted positions into positions (see FIGURE 1) for locating bead wires in positions surrounding the bead gripping means. Each assembly 43 comprises a bead setting ring 44 provided with a plurality of radially outwardly extending projections 45. The ring 44 is radially movably mounted within an annular mounting means 46 by means of the projections 45 slidable within holes 47 provided in the mounting means and bolts 48 slidable within holes 49. Compression springs 50 are provided around the bolts between the projections 45 and an abutment surface 51 of the mounting means for holding the ring 44 normally in a position radially-spaced apart from the mounting means.

The apparatus also includes a pair of breaker fitting rings 52 which are mounted coaxially with the drum, one on each side of the mid-circumferential plane. The rings are movable axially towards each other (by means not shown) from positions axially clear of the drum, as shown in FIGURE 1, into positions (shown in FIGURE 3) for locating a breaker symmetrically with respect to the mid-circumferential plane of a tire carcass carried upon the drum, as will be described. The rings are also movable away from one another. Each of said rings 52 comprises two coaxial and relatively rotatable annuli, an inner annulus 53 and an outer annulus 54. The inner annulus has a inner peripheral surface 55 which conforms to the shape of a toroidally-shaped tire carried on the drum. The outer annulus is provided at the axially inner end of its outer peripheral surface with an annular breaker locating recess 56 having a radially extending shoulder 56a. The inner annulus is provided on its outer peripheral surface with a helical groove 57 which is engaged by a pin 58 (FIGURE 3) which extends radially inwardly from the inner peripheral surface of the outer annulus. Rotation of the outer annulus in the appropriate direction upon the inner annulus, therefore, results in axial movement of the outer annulus relative to the inner annulus for a purpose to be described. Means are provided for securing the two annuli together in any of a series of relative axial positions of the annuli, said means comprising a member in the form of a spring loaded ball (not shown) mounted for radial movement within a recess in the inner peripheral surface of the outer annulus, the ball being engageable with any one of a plurality of blind holes (not shown) formed on the outer periphery of the inner annulus.

A ply-turn up device (not shown) of known form together with rotatable ply turn-up spinners is provided at each end of the drum.

In operation of the apparatus, the drum is initially in the state shown in FIGURE 1 with the end members in spaced-apart relationship, the segments 29 in an uncollapsed condition with the diaphragm 30 in a cylindrical condition supported upon the segments, and the bead setting rings and breaker fitting rings in retracted positions.

A sheet of rubber and plies 59 of tire building fabric are laid, in a manner well known in the art, upon the cylindrical surface of the diaphragm to build a tire carcass 60, the ends of the plies extending axially over the end members. Bead wires 61, mounted in the setting rings 43 are moved into position surrounding the bead gripping means 32, as shown in FIGURE 1. The bag 35 of each gripping means is inflated, as shown in FIGURE 2, to expand the segments 36 and the ring 38 radially outwardly thus expanding the parts of the carcass plies carried upon the bead gripping means into engagement with the bead wire and gripping the bead wire and carcass plies within the groove 39 of the ring 38. During the expansion of the rings 38, if either of the bead wires is not disposed coaxially with respect to the carcass, the bead wire is moved with the bead setting ring in a radial direction within the mounting means 46 upon the slidable bolts 48 to coaxially position the bead wire. Expansion of the bead gripping means ceases when the abutments 42 contact the abutments 40 of the end member. The bead setting rings are then moved to their retracted positions shown in FIGURE 2, after which the ends of the plies are turned over the bead wires.

The breaker fitting rings are moved towards each other into their axially innermost positions shown in FIGURE 3, the diaphragm then being inflated simultaneously with the movement towards each other of the end members 2 and 2a, by means of the rotation of the shaft 8 and the end members during the non-rotatable clamping of the sleeve 17, which causes simultaneous collapsing radially outwardly, within the diaphragm, of the segments 29. The carcass 60 is thus formed into a toroidal shape (FIGURE 3) in which it engages the inner peripheral surfaces of the annuli 53 of the breaker fitting rings, movement of the end members and of the tire beads being limited by engagement of the end members with the annular partition 26.

The outer annuli 54 of the breaker fitting rings are then moved with respect to the inner annuli to adjust, symmetrically with respect to the mid-circumferential plane, the distance between the radially extending shoulders to correspond with the width of a breaker layer 62 to be utilized. The breaker layer is located in the recess, as shown in FIGURE 3, symmetrically with respect to the mid-circumferential plane of the shaped carcass. The breaker layer spans a gap between the opposing edges of the recess, enabling the breaker to be firmly adhered to the portion of the carcass in the region of the mid-circumferential plane. The breaker fitting rings are then retracted and the breaker layer 62 is rolled into position and firmly secured throughout its width down onto the carcass.

A second breaker layer (not shown), of different width, is then applied in a similar manner symmetrically upon the first layer, the second layer being symmetrically located by adjusting the width between the shoulders 56a, as before, to correspond to the width of the second layer. Thus, a number of breaker layers of different axial widths can be successively applied symmetrically to the carcass with the use of the breaker fitting rings 52.

When the final breaker layer has been applied, the rings 52 are removed axially away from one another and tread and sidewall rubbers are applied to the shaped carcass. The tubes 35 are then deflated to release the bead portions of the tire, and the end members are moved away from one another while the diaphragm 30 is gradually deflated to reform the building drum into its true cylindrical shape to enable the built tire to be removed axially over and clear of the drum.

In one alternative method of building a tire upon the apparatus, the carcass is shaped into a toroidal shape before the ends of the plies are turned around the bead wires, and, in another alternative method, the breaker fitting rings are located in their axially inner positions for locating a breaker strip symmetrically upon an inflated carcass after the carcass has been inflated into its toroidal condition.

In a modification of the apparatus described above, the diaphragm 30 of the drum is provided with a steel cord reinforcement.

Having now described my invention, what I claim is:

1. Apparatus for the manufacture of pneumatic tires comprising a tire building drum having a pair of end members, a flexible inflatable cylindrical diaphragm attached at its end to the end members, one end to each end member, a plurality of collapsible intermediate rigid drum segments located between the end members and radially within the diaphragm to support the diaphragm in its cylindrical state in the uncollapsed state of the segments, the segments being mounted between the end members in pairs, said pairs lying side-by-side circumferentially of the drum and the segments of each pair lying end-to-end axially of the drum, the remote ends of the segments of each pair being pivotally mounted to the end members one end to each end member, and the adjacent ends of the segments being pivotally connected together for movement of the adjacent ends radially outwardly of the drum to collapse the segments radially outwardly upon axially inward movement of the end members, means for collapsing the intermediate segments and for moving the end members towards and away from each other, and means for connection to a source of pressurized fluid to inflate the diaphragm simultaneously with movement of the end members towards one another.

2. Apparatus according to claim 1 wherein an annular support is provided for supporting the segments in their uncollapsed state, said support being mounted upon the drum radially inwardly of the segments for engagement of the outer peripheral surface of the annular support with the inner peripheral surface of the segments.

3. Apparatus according to claim 2 wherein the end members are engageable with the annular support during their axial inward movement to limit movement towards each other of the end members.

4. Apparatus according to claim 1 wherein the means for moving the segments towards and away from each other comprises a screw-threaded member, said end members being received in screw-threaded engagement with said member whereby, upon relative rotation between the end members and the screw-threaded member in either one or the other direction, the end members move towards or away from one another.

5. Apparatus according to claim 4 provided with a pair of telescoping coaxial sleeves which extend between and are secured to the end members, one sleeve to each end member, sealing means being provided to fluid-tightly seal an annular chamber contained between the end members, the diaphragm and the telescoping sleeves.

6. Apparatus according to claim 1 wherein the diaphragm has a steel cord reinforcement.

7. Apparatus according to claim 1 wherein each end member incorporates bead gripping means.

8. Apparatus according to claim 7 wherein each bead-gripping means comprises an expansible resilient ring located coaxially with respect to its associated end member, said ring being provided upon its outer peripheral surface with an annular groove, and an inflatable member located radially within the expansible member for expanding said expansible member.

9. Apparatus according to claim 1 wherein a pair of bead-setting rings are provided, the rings being disposed one on each side of the mid-circumferential plane and each being movable from an axially retracted position clear of the drum into a position for locating a bead wire around a bead gripping means, each bead-setting ring being movable radially for positioning a bead wire coaxially with respect to the bead-gripping means.

10. Apparatus according to claim 9 wherein each bead-setting ring is radially slidably mounted in a mounting means, springs being provided between the bead-setting ring and the mounting means for holding said ring normally in a position radially spaced-apart from the mounting means, said ring being radially displaceable against the action of the springs.

11. Apparatus according to claim 1 provided with a pair of breaker fitting rings which are mounted coaxially with the drum one on each side of the mid-circumferential plane, each of said rings being provided with an inner peripheral surface which conforms to the shape of a toroidally-shaped tire carried on the drum and an outer peripheral surface which is provided on its axially inner end with an annular breaker locating recess, said rings being movable axially towards one another into positions for locating a breaker within the annular recesses in a position which is symmetrical with respect to the mid-circumferential plane of a tire carcass carried upon the drum, the rings also being movable away from one another.

12. Apparatus according to claim 11 wherein each breaker fitting ring comprises two annuli, one contained radially within the other, the radially inner annulus having an inner peripheral surface which conforms to the shape of a toroidally-shaped tire carried on the drum and the annular recess being provided on the outer peripheral surface of the radially outer annulus, the radially outer annuli being axially movable upon the radially inner annuli for adjusting the axial width between the annular recesses when the fitting rings are disposed in a position for locating breakers of different axial widths upon the carcass, means being provided for securing the annuli together in any one of a series of positions wherein the width of the annular recess is of a different value.

13. Apparatus according to claim 12 wherein in each breaker fitting ring the annuli are relatively rotatable and a helical groove is formed on one of the opposing peripheral surfaces of the annuli, a pin secured to the other peripheral surface being engageable within the groove to allow for axial and relative rotational movement of the annuli, and the means for securing the annuli together comprises a member mounted upon one annulus for radial movement into and out of engagement with any of a plurality of spaced-apart holes provided on the opposing surface of the other annulus.

References Cited by the Examiner

UNITED STATES PATENTS

| | | | |
|---|---|---|---|
| 1,435,895 | 11/22 | Hoover | 156—414 X |
| 1,562,754 | 11/25 | Gautier | 156—394 |
| 1,577,664 | 3/26 | Tew | 156—394 |
| 2,814,330 | 11/57 | Vanzo et al. | 156—394 |
| 3,035,629 | 5/62 | Vanzo et al. | 156—415 X |
| 3,111,443 | 11/63 | Vanzo et al. | 156—416 |
| 3,121,651 | 2/64 | Berglin et al. | 156—398 |
| 3,127,294 | 3/64 | Porter | 156—398 |

FOREIGN PATENTS 856,513  11/52  Germany.

EARL M. BERGERT, *Primary Examiner.*